United States Patent

[11] 3,621,333

| [72] | Inventors | Albert D. Gilchrist<br>Rocky River;<br>Chung H. Woo, Cleveland Heights, both of Ohio |
|---|---|---|
| [21] | Appl. No. | 823,686 |
| [22] | Filed | May 12, 1969 |
| [45] | Patented | Nov. 16, 1971 |
| [73] | Assignee | Victoreen Leece Neville, Inc.<br>Cleveland, Ohio |

[54] CONTROL FOR DEENERGIZING AN ALTERNATOR WHEN EXPOSED TO WATER
13 Claims, 3 Drawing Figs.

[52] U.S. Cl. .................................................. 317/13, 317/9
[51] Int. Cl. ......................................... H02h 7/06, H02h 7/08, H02h 7/10
[50] Field of Search ........................................... 317/10, 60, 13, 18, 148.5; 207/196; 307/95, 116, 118; 340/419, 235, 242, 222; 200/61.04, 61.05; 114/20; 136/182

[56] References Cited
UNITED STATES PATENTS

| 2,102,018 | 12/1937 | Mendenhall et al. | 200/61.05 |
|---|---|---|---|
| 3,253,188 | 5/1966 | Nissel | 317/10 |
| 3,255,324 | 6/1966 | Ovshinsky | 200/61.04 |
| 3,260,809 | 7/1966 | Leasko | 200/61.04 |
| 3,300,702 | 1/1967 | Noddin | 320/25 |
| 3,407,337 | 10/1968 | Benham | 317/18 |
| 3,436,608 | 4/1969 | Caulier et al. | 317/148.5 |
| 3,525,902 | 8/1970 | Davidson et al. | 317/18 X |
| 3,033,148 | 5/1962 | Cooke | 114/20 X |
| 3,343,152 | 9/1967 | Hart | 136/182 |
| 3,407,337 | 10/1968 | Benham | 317/18 |
| 3,416,131 | 12/1968 | Mackenzie et al. | 136/182 |
| 3,440,396 | 4/1969 | Greene | 307/118 X |
| 3,253,188 | 5/1966 | Nissel | 317/10 |
| 3,300,702 | 1/1967 | Noddin | 320/25 |

Primary Examiner—D. F. Duggan
Assistant Examiner—Ulysses Weldon
Attorney—Yount, Flynn & Tarolli

ABSTRACT: Control for an alternator having a water sensor which causes the alternator field winding to be deenergized whenever fresh water or salt water is present, thereby avoiding corrosion of the alternator windings by electrolysis.

INVENTORS
ALBERT D. GILCHRIST
CHUNG H. WOO
BY
Yount, Flynn and Tarolli
ATTORNEYS

CONTROL FOR DEENERGIZING AN ALTERNATOR WHEN EXPOSED TO WATER

This invention relates to a control arrangement for protecting an alternator from damage to its windings when exposed to water.

A principal object of this invention is to provide a protective control for an alternator or corresponding electrodynamic machine having a winding to be energized, and which senses the presence of water and causes the alternator field winding to be kept deenergized as long as water is present, thereby avoiding corrosion damage to the alternator windings due to electrolysis of the water.

Further objects and advantages of this invention will be apparent from the following detailed description of a presently preferred embodiment thereof with reference to the accompanying drawing in which.

Figure 1:
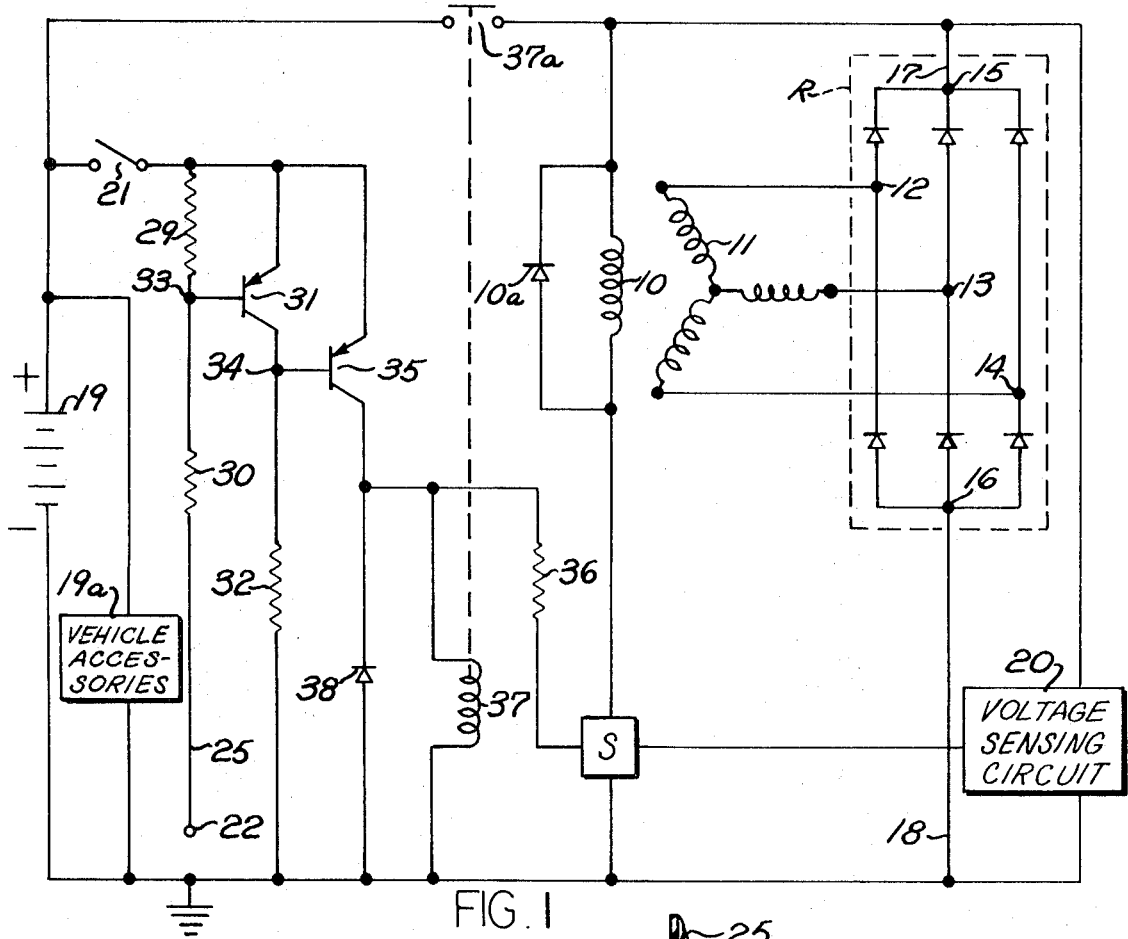
FIG. 1 is a schematic electrical circuit diagram showing an alternator system which includes a protective control in accordance with the present invention.

Referring to FIG. 1, the present control arrangement is shown associated with a conventional alternator having a field winding 10 on the rotor and a three-phase, Y-connected stator winding 11 on the stator. A conventional field discharge rectifier 10a is connected across the alternator field winding 10. The different phase windings of the stator are connected to the respective input terminals 12, 13 and 14 of a full-wave output rectifier R, having positive and negative output terminals 15 and 16 connected through respective load conductors 17 and 18 to a load which includes a battery 19 and the vehicle accessories 19a. A conventional voltage-sensing circuit 20 senses the voltage across the load conductors 17, 18 and controls the operation of a switch device S, connected in series with the alternator field winding 10 across the battery through an electrically operated relay contact 37a. The switch device S may be a transistor, an SCR, or an electromechanically-operated switch capable of controlling the current flow through the alternator field winding, such that the field current is interrupted whenever either the voltage across the load conductors 17, 18 is above a predetermined value or the presence of water is detected as explained hereinafter.

In accordance with the present invention, the energization of the alternator field winding is also under the control of a sensor which senses the presence of water at the alternator. When the presence of either fresh water or salt water is detected by the sensor, it prevents the energization of the alternator field winding so as to minimize corrosion of the alternator windings due to the electrolytic action of the water.

Figure 2:
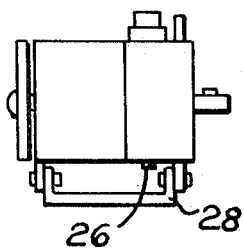
FIG. 2 is a complete pictoral view of an alternator shown with a mounting arrangement.
Figure 3:
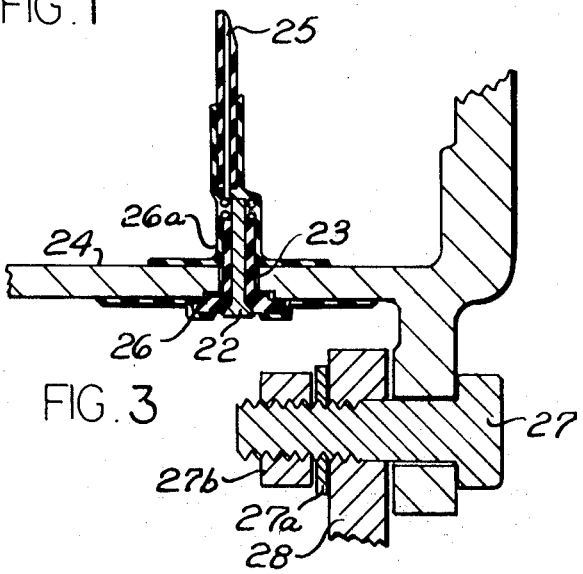
FIG. 3 is a fragmentary vertical sectional view of the lower end of the alternator housing where the water sensor in the present control is located.

In one practical embodiment this sensor may have the physical form shown in FIG. 3. One electrode of the sensor is a conductive rod 22 extending through an opening 23 in a bottom wall 24 of the alternator housing. A suitable dielectric insulator 26 supports the rod electrode 22 which is connected to the control circuit by an insulated conductor 25, in the opening 23 as shown and electrically insulates it from the alternator housing. To further minimize any leakage of water to the rod electrode from the opening in the alternator housing the areas surrounding the electrode assembly 22, 26 are coated as shown with a suitable dielectric potting material 26a. The alternator housing itself is grounded and serves as the second electrode of the sensor. Preferably, the alternator housing is attached by bolts 27, lockwashers 27a and tightening nuts 27b to the metal support bracket 28. As shown in FIG. 2 the rod electrode 22 is exposed at the outside of the housing (below the bottom wall 24) and the housing itself is also directly exposed to any water that may be present above the level of the support bracket 28.

This sensor operates primarily on the principle of electrolytic dissociation of water or salt between two electrodes which are immersed in either fresh or salt water respectively.

In the case of fresh water, dissociation gives the hydrogen ion, which is positively charged, and the hydroxyl ion, which is negatively charged. In the case of salt water, dissociation gives the sodium ion, which is positively charged, and the chlorine ion, which is negatively charged. When an operating voltage is applied across the two electrodes of the sensor, the positively charged ions will be attracted by the negative electrode and repelled by the positive electrode. The negatively charged ions, on the other hand, will be attracted by the positive electrode and repelled by the negative electrode. Upon reaching the respective sensor electrodes, the positively charged ion will combine with one electron to form one specific atom and the negatively charged ion will give off one electron to form one specific atom. These atoms will combine into respective molecules and escape as separate gases. This constitutes a minute flow of current through the sensor (i.e., between the positive and negative electrodes). Conversely, when fresh or salt water is not present at the sensor, the process of electrolytic dissociation will not occur and there will be no current through the sensor.

Referring again to FIG. 1, the sensor is connected in series with a pair of resistors 29 and 30 across the battery through switch 21.

A preamplifier stage is connected across the battery to amplify the sensor current. This preamplifier stage comprises a first PNP transistor 31 and a resistor 32 connected in series with each other across the battery 19 through the switch 21. The base electrode of transistor 31 is connected directly to the juncture 33 between resistors 29 and 30, and the emitter electrode is connected to the positive battery terminal through switch 21.

The juncture 34 between the collector electrode of the first transistor 31 and the upper end of resistor 32 is connected directly to the base electrode of a second PNP transistor 35 in a power output stage. The emitter electrode of transistor 35 is connected to the positive battery terminal through switch 21. A relay coil 37 and a coil discharge rectifier 38 are connected in parallel with each other between the collector electrode of transistor 35 and the grounded negative terminal of the battery. The upper end of resistor 36 is also connected to the collector electrode of transistor 35 and the lower end of this resistor is connected to the switch device S. This establishes the control and operation of switch device S by the sensor also. Relay coil 37, when energized sufficiently, is adapted to close a normally open set of relay contacts 37a which connect the parallel circuit comprising the output rectifier R and the excitation circuit of the alternator field 10 across the battery.

In this operation of this system, in the absence of water at the sensor, there is no current through resistors 29 and 30 and the sensor. Consequently, there is no signal between the base and emitter of the first transistor 31 in the preamplifier stage and this transistor is nonconductive. Consequently, the base of the second transistor 35 assumes a potential which is negative with respect to its emitter, and transistor 35 conducts saturation current. Therefore, relay coil 37 is energized and relay contacts 37a are closed, permitting the alternator field winding 10 to be energized as long as switch S remains closed.

If either fresh water or salt water bridges the sensor electrodes (which are rod 22 and the alternator housing), the resulting current through resistor 29 causes the base of the first transistor 31 to become negative with respect to the emitter, turning on transistor 31 to saturation. Consequently, almost all of the voltage drop across the preamplifier stage takes place across resistor 32. As a result, the base of the second transistor 35 in the power output stage is at almost the same potential as its emitter, and transistor 35 becomes nonconductive, thereby deenergizing relay coil 37. Relay contacts 37a and switch device S then open to break the energization circuit for the alternator field winding 10.

The switch device S may be a relay which requires two coils to be energized to pull in, but will drop out if one of the coils is deenergized. One coil is energized from the transistor 35 and the other is energized from the voltage-sensing device 20 to hold closed contacts in series with the field. The voltage-sensing device 20 may be an overvoltage-sensing relay which closes contacts at a value below a predetermined voltage to supply current to a coil of the switch devices. Conventionally, the dropout voltage of such a relay is slightly below its pull-in voltage.

From the foregoing description it will be apparent that the present control arrangement safeguards the alternator against harmful corrosion of its windings due to electrolysis when the windings are exposed to fresh water or salt water, by deenergizing the alternator field winding as long as the water is present. The control has a fail-safe operation because any circuit malfunction between the power supply and relay coil 37 will cause the latter to become deenergized, opening its contacts 37a to disconnect the alternator power rectifier unit and the alternator field winding from the power supply.

While a presently preferred embodiment of this invention has been described in detail with reference to the accompanying drawing, it is to be understood that various modifications differing from the particular arrangement shown may be adopted without departing from the spirit and scope of this invention.

What is claimed is:

1. In combination, an electrodynamic generating machine having a field winding to be energized to effect operation of the machine, electrical circuit means connected to said machine including a circuit for energizing said winding, sensor means for detecting the presence of water at the machine, and control means including means in said electrical circuit means controlled by said sensor means to effect deenergization of said winding and prevent energization thereof from current provided by said generating machine as well as from a power supply source for said generating machine.

2. The combination of claim 1 wherein said machine has a housing of electrically conductive material, and said sensor means comprises a first electrode projecting from said housing at its bottom side and insulated from the housing, and wherein said housing constitutes the second electrode of said sensor means.

3. The combination as defined in claim 1 wherein said sensor means comprises a pair of spaced electrodes, and circuit means for establishing a potential thereacross, said control means comprising a first transistor responsive to the current flow between said electrodes for effecting the deenergization of said winding.

4. The combination as defined in claim 3 wherein said first transistor has its base connected to one of said electrodes and is nonconductive in the absence of current flow between said electrodes.

5. The combination as defined in claim 3 wherein said control means comprises a power output stage including a second transistor connected to said first transistor to be maintained conductive when said first transistor is nonconductive and to be rendered nonconductive when said first transistor is conductive, said control means being connected to said second transistor and controlling the energization of said winding to provide for such energization while said second transistor is conductive and to deenergize said winding when said second transistor is nonconductive.

6. The combination as defined in claim 3 wherein said electrical circuit means includes a battery and said machine is a generating machine and the electrical circuit means connects said winding and said battery in parallel across the output of said machine and said control means includes means for disconnecting said battery from said machine and said winding and means for disconnecting said winding from said machine.

7. The combination as defined in claim 6 wherein said control means comprises a power output stage connected to said first transistor including a second transistor connected to said first transistor to be maintained conductive when said first transistor is nonconductive and to be rendered nonconductive when said first transistor is conductive, and control means connected to said second transistor and controlling the energization of said winding.

8. The combination as defined in claim 3 wherein said machine has a housing of electrically conductive material constituting one of said electrodes and the other of said electrodes projects from said housing adjacent its bottom side and is insulated from said housing.

9. The combination as defined in claim 1 in which said electrical circuit means comprises a battery and wherein said circuit is connected across said battery and the output of said generating machine and said means in said electrical circuit means for preventing energization of said field winding comprises means in said circuit.

10. The combination as defined in claim 9 wherein said generating machine comprises an alternator and said electrical circuit means includes a rectifier for the alternator output, said circuit being connected across the output of said rectifier.

11. The combination as defined in claim 9 wherein said electrical circuit means includes a switch device which connects said battery to said circuit and said switch device is actuated in response to said sensor means to disconnect said battery from said circuit on the detection of water.

12. The combination as defined in claim 11 wherein said generating machine comprises an alternator and said electrical circuit means includes the combination includes a rectifier for the alternator output, said circuit being connected across the output of said rectifier.

13. In combination, an electrodynamic generating machine having a field winding to be energized to effect operation of the machine, electrical circuit means connected to said machine including a circuit for establishing current flow in said winding and said machine, sensor means for detecting the presence of water at the machine, and control means including means in said electrical circuit means controlled by said sensor means to prevent said current flow in said machine and said winding due to current provided by said generating machine as well as from a power supply source for said generating machine.

* * * * *

UNITED STATES PATENT OFFICE
CERTIFICATE OF CORRECTION

Patent No. 3,621,333     Dated November 16, 1971

Inventor(s) Gilchrist, Albert D and Woo, Chung H.

It is certified that error appears in the above-identified patent and that said Letters Patent are hereby corrected as shown below:

Claim 12, column 4, line 42, "the combination includes" should be deleted.

Signed and sealed this 23rd day of May 1972.

(SEAL)
Attest:

EDWARD M. FLETCHER, JR.
Attesting Officer

ROBERT GOTTSCHALK
Commissioner of Patents